(12) United States Patent
Villadsen (10) Patent No.: US 8,312,437 B2
(45) Date of Patent: Nov. 13, 2012

(54) STRUCTURED SEARCH IN SOURCE CODE

(75) Inventor: Peter Villadsen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 12/345,691

(22) Filed: Dec. 30, 2008

(65) Prior Publication Data

US 2010/0169871 A1    Jul. 1, 2010

(51) Int. Cl.
*G06F 9/45* (2006.01)

(52) U.S. Cl. ........ 717/144; 717/137; 717/141; 717/143; 707/706; 707/708; 707/713

(58) Field of Classification Search .............. None
See application file for complete search history.

(56) References Cited

U.S. PATENT DOCUMENTS

| | | | | |
|---|---|---|---|---|
| 5,671,416 | A * | 9/1997 | Elson | 717/106 |
| 6,061,513 | A * | 5/2000 | Scandura | 717/142 |
| 6,256,618 | B1 | 7/2001 | Spooner et al. | |
| 6,314,562 | B1 | 11/2001 | Biggerstaff | |
| 6,516,461 | B1 | 2/2003 | Ichisugi | |
| 6,801,905 | B2 * | 10/2004 | Andrei | 1/1 |
| 7,184,998 | B2 * | 2/2007 | Nica | 1/1 |
| 7,213,024 | B2 * | 5/2007 | Keith, Jr. | 707/797 |
| 7,467,375 | B2 * | 12/2008 | Tondreau et al. | 717/137 |
| 7,720,869 | B2 * | 5/2010 | Frieder et al. | 707/796 |
| 7,975,233 | B2 * | 7/2011 | Macklem et al. | 715/763 |
| 2003/0172059 | A1 * | 9/2003 | Andrei | 707/3 |
| 2003/0226132 | A1 * | 12/2003 | Tondreau et al. | 717/116 |
| 2005/0010896 | A1 * | 1/2005 | Meliksetian et al. | 717/106 |
| 2005/0166193 | A1 * | 7/2005 | Smith et al. | 717/143 |
| 2005/0273772 | A1 * | 12/2005 | Matsakis et al. | 717/136 |
| 2006/0212859 | A1 * | 9/2006 | Parker et al. | 717/143 |
| 2006/0225052 | A1 | 10/2006 | Waddington et al. | |
| 2006/0230378 | A1 | 10/2006 | Waddington et al. | |
| 2007/0038985 | A1 * | 2/2007 | Meijer et al. | 717/137 |
| 2007/0106658 | A1 | 5/2007 | Ferrari et al. | |
| 2007/0294678 | A1 * | 12/2007 | Novoselsky | 717/144 |
| 2008/0196016 | A1 * | 8/2008 | Todd | 717/143 |
| 2008/0216060 | A1 * | 9/2008 | Vargas | 717/137 |
| 2008/0306986 | A1 * | 12/2008 | Doyle, Sr. | 707/102 |

OTHER PUBLICATIONS

Title: XOgastan: XML-oriented gcc AST analysis and transformations, author: Antoniol, G et al, source: IEEE, dated: 2003.*

(Continued)

*Primary Examiner* — Chameli Das
(74) *Attorney, Agent, or Firm* — Hope Baldauff Hartman, LLC (57) ABSTRACT

Architecture allows a programmer to answer questions about the source code the programmer is authoring, questions that cannot be answered by other means. A searching mechanism is provided over a much more structured presentation of the source code. The architecture utilizes components that provide an intimate knowledge about the structure of the text, namely, the source code of some particular programming language. The search mechanism employs an abstract syntax tree representation of the code over which the search is conducted. The program source code (as edited by the programmer) is transformed into the abstract syntax tree to embody the structure of the program. If the syntax tree is provided in XML, for example, an XML search mechanism such as Xpath can be utilized to perform the actual searching. This tree is then queried, allowing richer searching criteria to be expressed (by virtue of the structured format of the tree).

15 Claims, 8 Drawing Sheets

OTHER PUBLICATIONS

Hughes, Kevin, "Projects:Source Code Search with Syntax-Based Heuristics", retrieved at <<http://cs343-spr0607.stanford.edu/index.php/Projects:Source_Code_Search_with_Syntax-Based_Heuristics>>, Jun. 13, 2007, p. 1-8.

Paul, et al., "A Framework for Source Code Search Using Program Patterns", retrieved at <<http://www.eecs.umich.edu/~aprakash/papers/paul-prakash-ieeetse94.pdf>>, IEEE Transactions on Software Engineering, vol. 20, No. 6, Jun. 1994, p. 463-475.

Obasanjo, et al., "The Best of Both Worlds: Combining XPath with the XmlReader", retrieved at <<http://msdn.microsoft.com/en-us/library/ms950778.aspx>>, May 5, 2004, p. 1-8.

"Search Implementation", retrieved at <<http://jackrabbit.apache.org/search-implementation.html>>, Oct. 3, 2008, p. 1-2.

"XML and Scheme ", retrieved at <<http://okmij.org/ftp/Scheme/SXML-short-paper.html>>, Mar. 4, 2001, p. 1-6.

* cited by examiner

STRUCTURED SEARCH IN SOURCE CODE

BACKGROUND

When programmers develop code, there is oftentimes a need to work with the code such as refactoring, for example, to move code sections to change the structure without altering the code behavior, find certain properties about the code (variable declarations), or to verify if While statements lack a following compound statement, and so on. These types of question are easy to ask but current tools are not sufficiently robust to provide the answers.

Current technology offered by source code editing systems use only rudimentary searching capabilities, usually confined to using simple text-based searches or searches using regular expressions. Searching is based on the unstructured text representation of the source code. For example, searching can be accomplished through regular expression matching.

The view that all tools provide is that the source code is simply a sequence of characters in a text editor. The code does not have any structure beyond the sequence of characters. This unstructured content makes it unsuitable for doing any sort of structured search because there is no structure upon which to base the search.

Text searches can be made against source code in much the same way as for searching for a particular word in a text document. The user can search for the occurrence of a particular word, and the system implementing the search (e.g., a text processor) will present all the matching places in the document. In some cases the searching facility is a little more advanced, allowing regular expressions to be used which can express things such as "Show me all instances in the document where 3 "w" occurs followed by a dot followed by any number of characters", etc. To these systems the searching occurs over a stream of otherwise unstructured text. However, the problem with this approach is that the system does not understand the problem domain that the text describes.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture allows a programmer to answer questions about the source code the programmer is authoring, as well as for others reviewing or who want to understand coding—questions that cannot be answered by other means. A searching mechanism is provided over a much more structured presentation of the source code. The search mechanism employs an abstract syntax tree (structured tree representation of the code) over which the search is conducted. The program source code (as edited by the programmer) is transformed into the abstract syntax tree to embody the structure of the program. If the syntax tree is provided in XML, for example, an XML search mechanism such as Xpath can be utilized to perform the actual searching.

The architecture utilizes components that provide intimate knowledge about the structure of the text, namely, the source code of some particular programming language. This tree is then queried, allowing richer searching criteria to be expressed (by virtue of the structured format of the tree). Productivity gains can be obtained in tools that leverage this technology, ultimately translating into greater programmer productivity.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture allows the programmer to answer questions about source code that cannot be answered by other means. For example, programming languages are structured by nature and defined by a grammar that exactly defines the allowed structure of legal programs (e.g., the program language syntax). The architecture uses that grammar to build an abstract syntax tree that is used for searching. Using an abstract syntax tree to represent the text (e.g., code) provides an intimate knowledge about the structure of the text.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
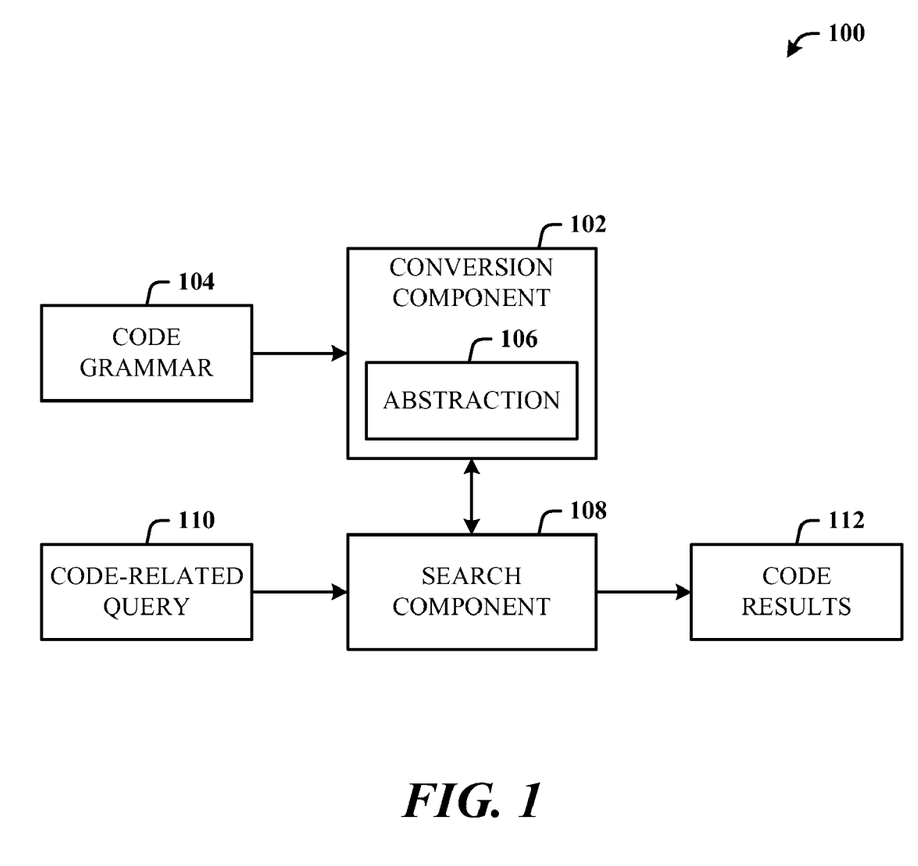
FIG. 1 illustrates a computer-implemented search system in accordance with the disclosed architecture.

FIG. 1 illustrates a computer-implemented search system 100 in accordance with the disclosed architecture. The system 100 can include a conversion component 102 for representing a grammar 104 of a program code as an abstraction 106, and a search component 108 for searching the abstraction 106 based on a code-related query 110 to obtain code results 112.

The abstraction 106 can be an abstract syntax tree expressed in an XML format. The search component 108 processes the query 110 over the abstract syntax tree according to an XML query language (e.g., Xpath). The query 110 can be in the form of an expression. The query expression is in the form of a grammatical unit, the processing of which initiates the search for program code statements. The query 110 can be in a form of a natural language expression such as "Does the function contain multiple return statements?", "Is the return statement the last statement?", or "Do any while statements contain statements that are not compound statements?" These queries are more complex than what can be expressed with conventional query specifications based on regular expressions or simple text searches.

Figure 2:
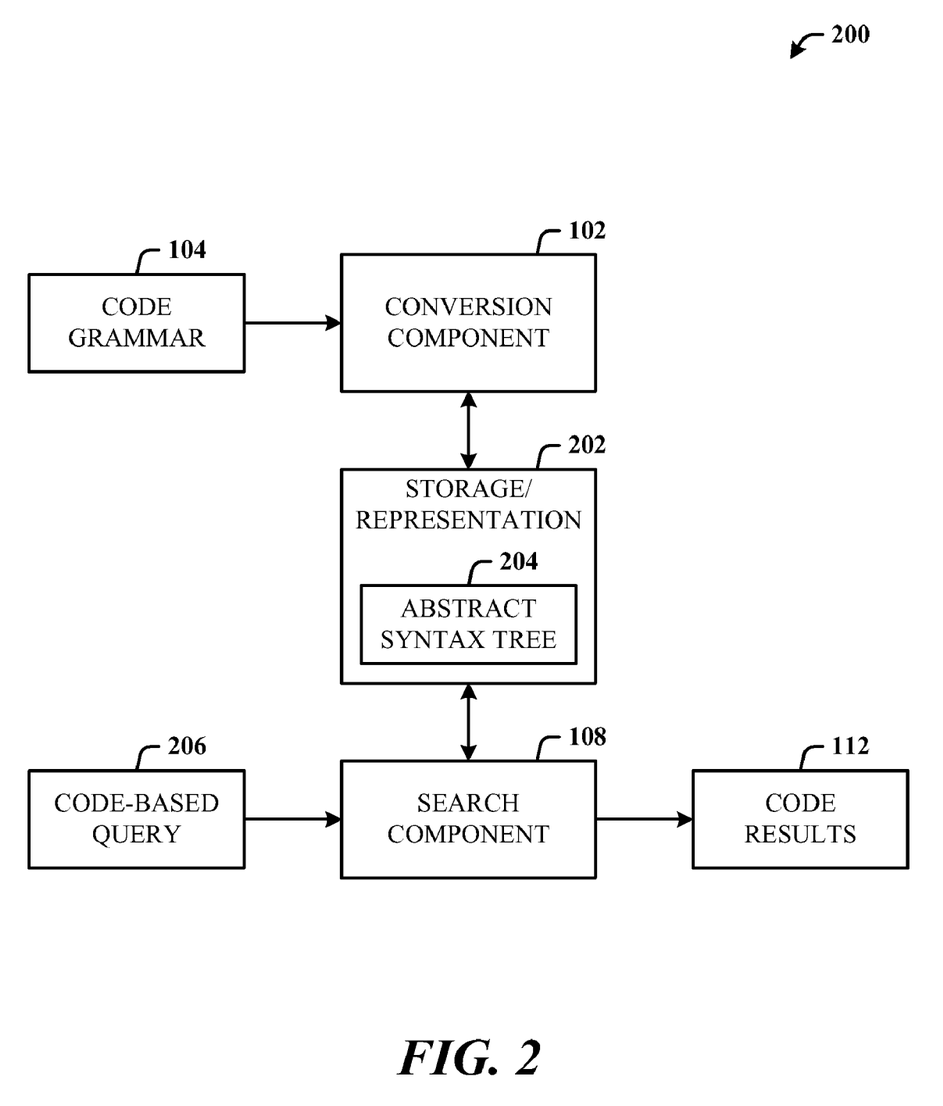
FIG. 2 illustrates a search system where the abstraction is searched in a cache memory.

FIG. 2 illustrates a search system 200 where the abstraction is searched in a storage/representation 202. The system 200 includes the conversion component 102 for representing the grammar 104 of the program code as an abstract syntax tree 204. The abstract syntax tree 204 can be searched while in different types of media, such as cache memory, mass storage, etc. Moreover, the tree 204 can be searched while in different representations such as XML, etc. The search component 108 is utilized for searching the abstract syntax tree 204 while in the storage/representation 202 based on a code-based query 206 to obtain the code results 112.

Put another way, the search system 200 includes the conversion component 102 for representing the syntax of the program code as the abstract syntax tree 204, and the search component 108 for searching the abstract syntax tree 204 based on the code-based query 206. The abstract syntax tree 204 can be represented in XML, and the search component 108 processes the query 206 over the abstract syntax tree 204 according to an XML query language (e.g., Xpath). The query 206 can be in the form of an expression that is a grammatical unit, the processing of which initiates the search for program code statements. The abstract syntax tree 204 can be stored in the cache memory 202 and the search component 108 performs the search on the abstract syntax tree 204 in the cache memory 202. The query 206 can be in the form of a natural language expression.

Figure 3:
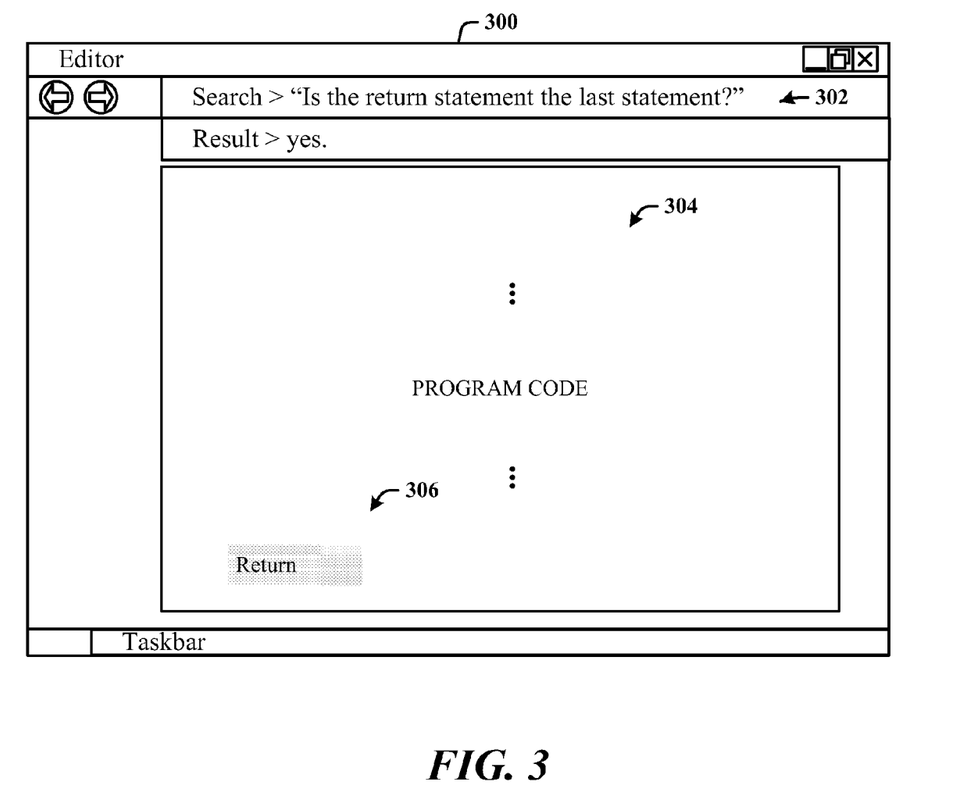
FIG. 3 illustrates an exemplary user interface for entering an expression to search program code.

FIG. 3 illustrates an exemplary user interface 300 for entering an expression 302 to search program code 304. In this example, the search query expression 302 is "Is the return statement the last statement?" Here, the result is "yes", and the user interface 300 shows the last Return statement 306 with emphasis (e.g., highlighting). The user interface 300 can then step through the results based on user interaction, for example.

Figure 4:
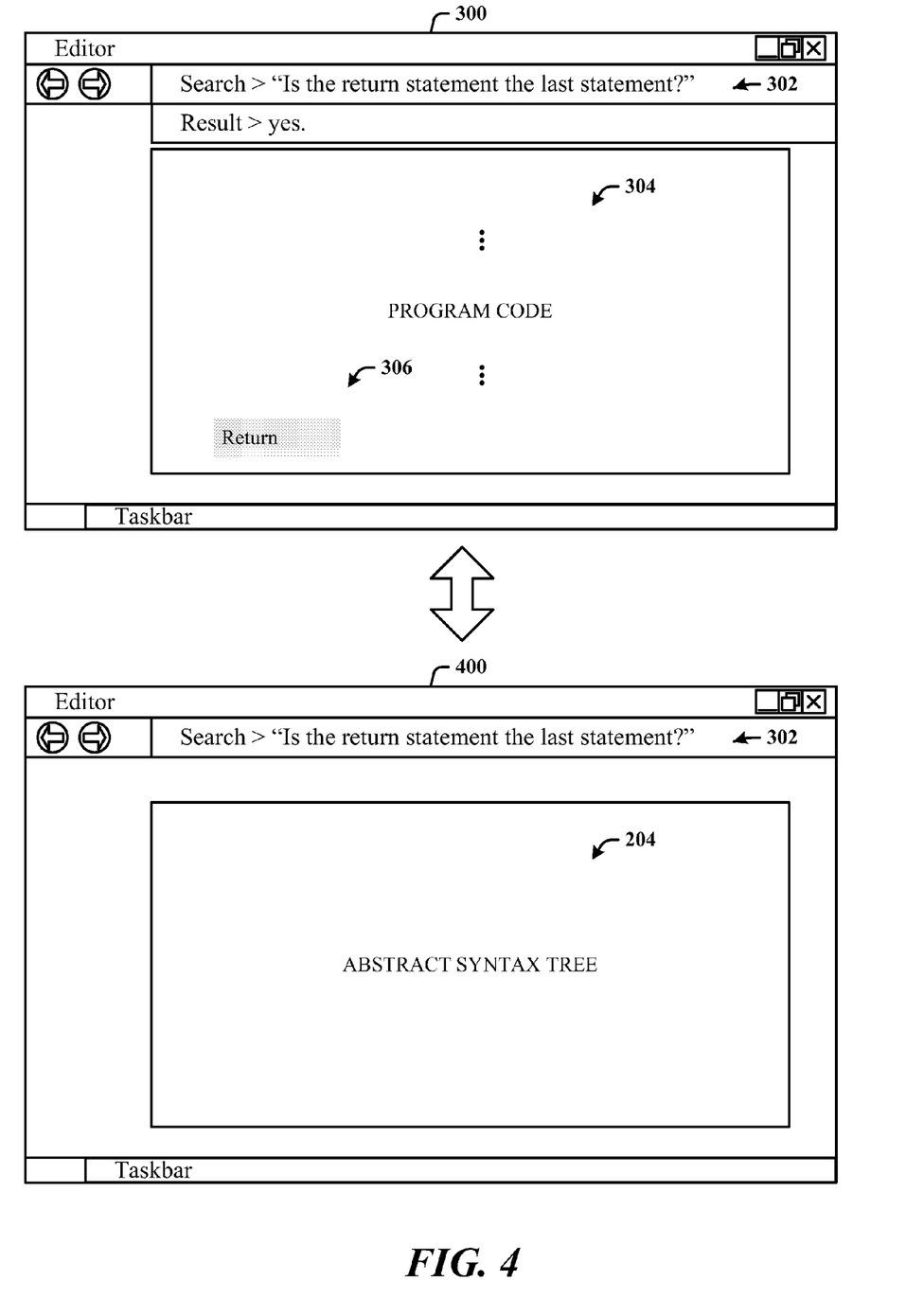
FIG. 4 illustrates that a user can navigate between the program code and the abstract syntax tree.

FIG. 4 illustrates that a user can navigate between the program code 304 and the abstract syntax tree 204. The abstract syntax tree 204 in the XML document presented above includes a "parameter" term. The parameter term includes a start position parameter (startpos) and an end position parameter (endpos). This means that a relationship exists for moving between the abstract syntax tree 204 and code (e.g., source) representation. The parameter in this case, named "i" of type "int" starts at position 38 and extends to position 43. Using this particular information, for example, the editor program can provide navigation between the abstract syntax tree 204 as shown in a user interface 400 and the actual textual representation in the program code 304 of the user interface 300.

Other sources of intra-navigation include parameters for defining the location of the body, declarations, variable declaration, fields, statements, methods, method modifiers, while statements, literals, compound statements, assigns, less statements, add statements, if statements, comments, and return positions, for example.

In one implementation, the abstract syntax tree 204 is represented in XML, a standard for representing structured data. The XML standard features a query language (Xpath) over XML documents that can be leveraged to provide rich searches.

In the following example, arbitrary typical imperative programming language is considered that features scopes, variable declarations, etc. The source code can be as follows:

```
protected real myFunction(int i, real b)
{
    int j = i;
    real result = b;
    while (j < 100)
    {
        result = result + j;
        if (j > 10)
            return result;
        j = j + 1;
    }
    return result;
}
```

One example of an abstract syntax tree (e.g., represented in XML) in an XML document is given below:

```
<?xml version="1.0" encoding="utf-16"?>
<Method Startpos="13" Endpos="278" Name="MyFunction" Type="int">
    <Comments />
    <Modifiers>
        <MethodModifier Name="protected" />
    </Modifiers>
    <Parameters>
        <Parameter Startpos="38" Endpos="43" Name="i" Type="int" />
        <Parameter Startpos="45" Endpos="51" Name="b" Type="real" />
    </Parameters>
    <Body Startpos="54" Endpos="278">
        <Declarations>
            <VariableDeclaration Name="j" Type="int" Startpos="61" Endpos="70">
                <Initialization>
                    <SimpleField Name="i" type="int" />
                </Initialization>
            </VariableDeclaration>
            <VariableDeclaration Name="result" Type="real" Startpos="77" Endpos="92">
                <Initialization>
                    <SimpleField Name="b" Type="real" />
                </Initialization>
            </VariableDeclaration>
        </Declarations>
        <Statements>
            <While Startpos="105" Endpos="254">
                <Comments />
                <Less Startpos="112" Endpos="119">
                    <SimpleField Name="j" Type="int" />
                    <IntLiteral Startpos="116" Endpos="119">100</IntLiteral>
                </Less>
                <CompoundStatement Startpos="126" Endpos="254">
                    <Comments />
                    <Assign Startpos="137" Endpos="156">
                        <SimpleField Name="result" Type="real" />
                        <Add Startpos="146" Endpos="156">
                            <SimpleField Name="result" Type="real" />
                            <SimpleField Name="j" Type="int" />
                        </Add>
                    </Assign>
                    <If Startpos="167" Endpos="206">
                        <Comments />
                        <Greater Startpos="171" Endpos="177">
                            <SimpleField Name="j" Type="int" />
```

```
                        <IntLiteral Startpos="175"
Endpos="177">10</IntLiteral>
                    </Greater>
                    <Return Startpos="192" Endpos="206">
                        <Comments />
                        <SimpleField Name="result"
Type="real" />
                    </Return>
                </If>
                <Assign Startpos="237" Endpos="246">
                    <SimpleField Name="j" Type="int" />
                    <Add Startpos="241" Endpos="246">
                        <SimpleField Name="j" Type="int" />
                        <IntLiteral Startpos="245"
Endpos="246">1</IntLiteral>
                    </Add>
                </Assign>
            </CompoundStatement>
        </While>
        <Return Startpos="260" Endpos="274">
            <Comments />
            <SimpleField Name="result" Type="real" />
        </Return>
    </Statements>
  </Body>
</Method>
```

Following are examples of searching code. A first example is to find all conditional statements (e.g., "if" statements) that do not contain a CompoundStatement. This can return the following results.

```
If (a > b)
    Return b;
But not
If (a>b)
{
    Return b;
}
The query is "//If/[not(CompoundStatement)]"
```

A second example is to find all "if" statements that have no "else" part. This can return the following results.

```
If(a > b)
{
}
But not
If(a > b)
{
    ... // consequent
}
Else
{
    ... // antecedent
}
Query: "//If[count(child::*) = 3]"
```

Note that there is one child for comment, another for the expression, and one or two children for the consequent and antecedent.

A third example is to find all methods that have no comments. This can return the following results.

```
Int MyFunction(int I, real b)
But not
// MyFunction does interesting calculations based on the
arguments....
    Int MyFunction(int I, real b)
    Query: /Method[count(Comments/Comment)=0]
```

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
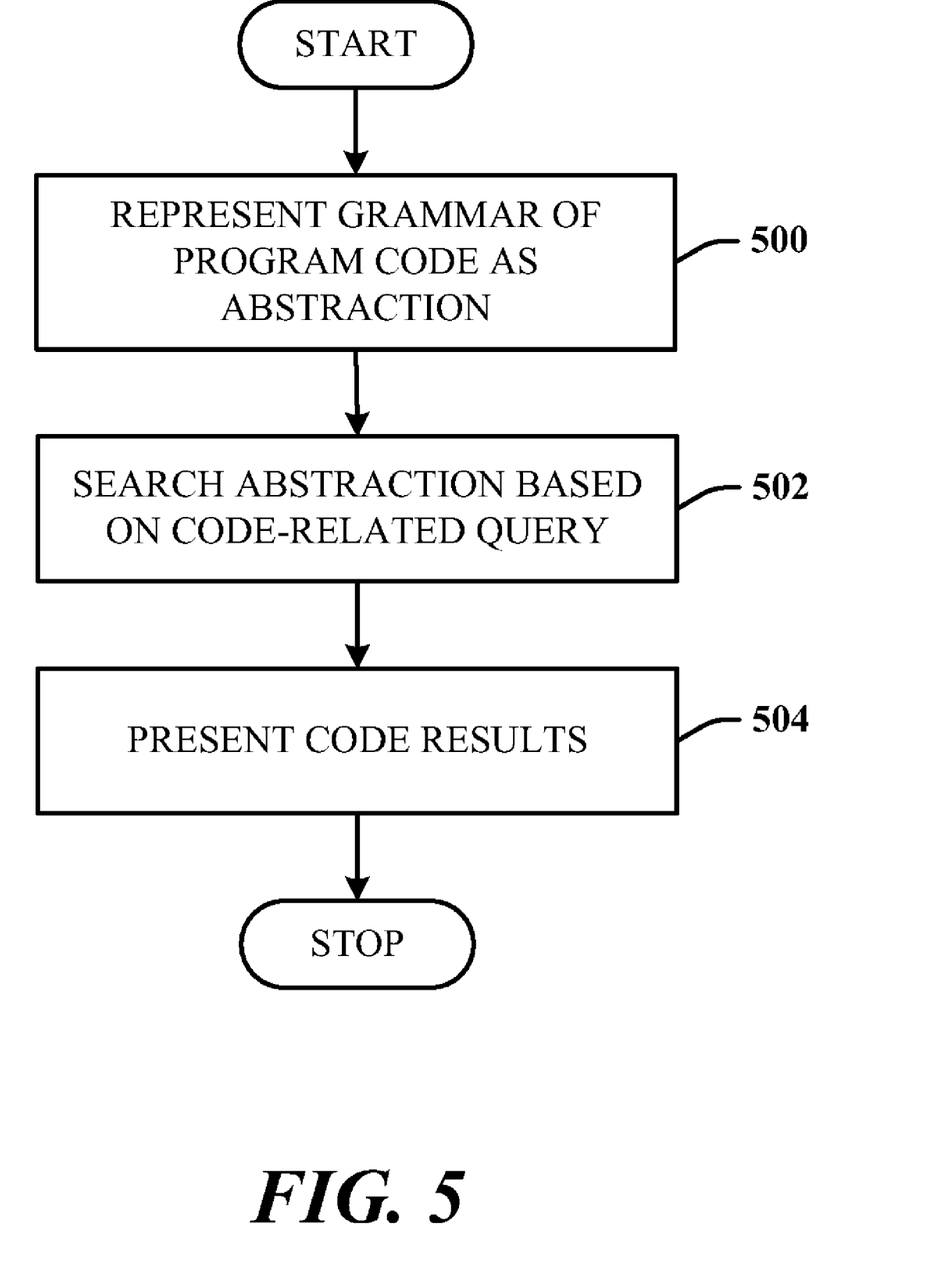
FIG. 5 illustrates a method of searching code.

FIG. 5 illustrates a method of searching code. At 500, a grammar of a program code is represented as an abstraction. At 502, the abstraction is searched based on a code-related query. At 504, code results are presented. As previously indicated, abstraction can be an abstract syntax tree. Moreover, the abstraction can be represented in XML. The XML abstraction can be searched using an Xpath language. Accordingly, the query can be composed as an expression structured as a grammatical unit. A relationship can be mapped between the abstraction and the program code. Thus, a portion of the abstraction associated with a section of the program code in which the code results are found can be presented.

Figure 6:
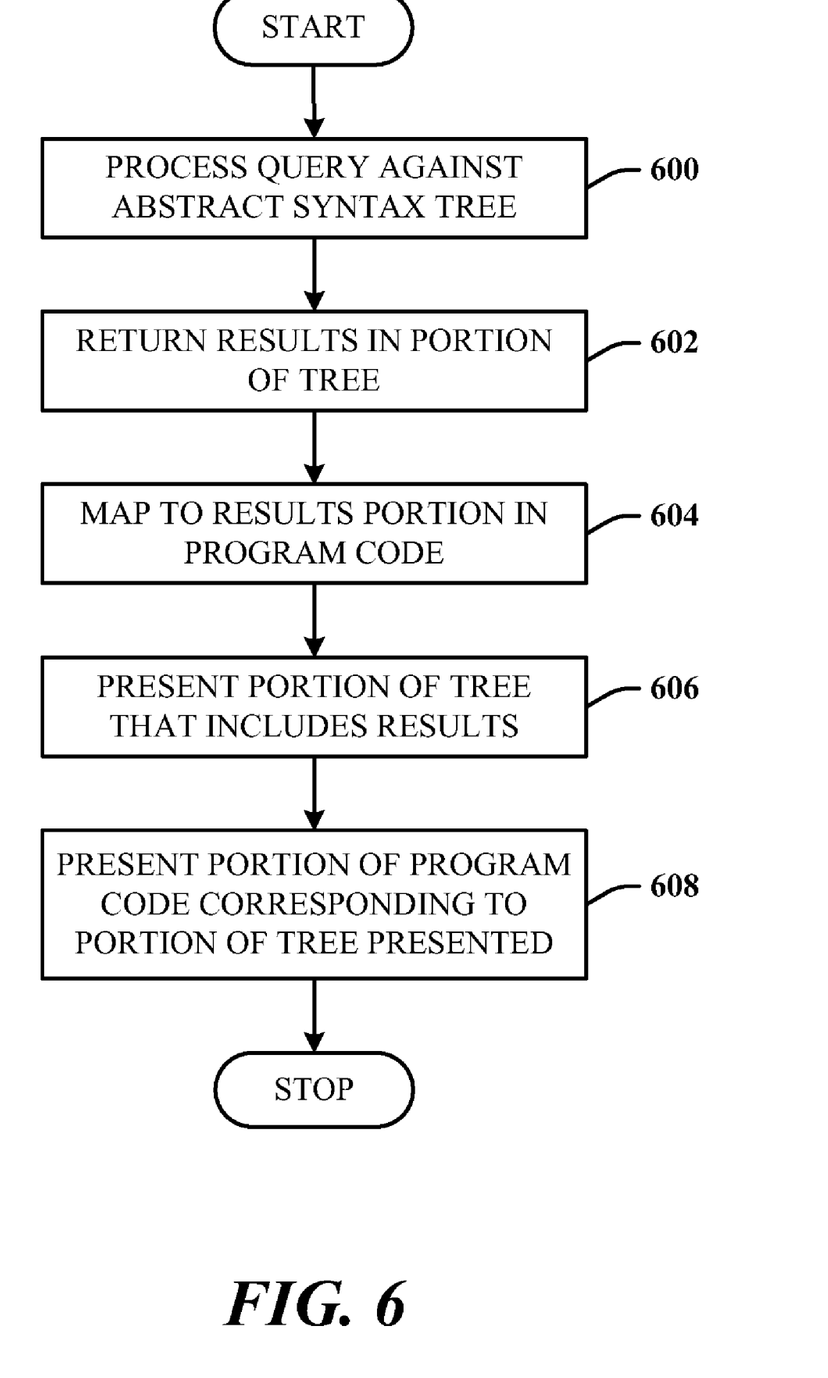
FIG. 6 illustrates a method of presenting a relationship between the abstraction and the program code based on the results.

FIG. 6 illustrates a method of presenting a relationship between the abstraction and the program code based on the results. At 600, a query is processed against the abstract syntax tree. At 602, results associated with a portion of the tree of the search are returned. At 604, the results portion is mapped to the corresponding portion in the program code. At 606, the portion of the tree that includes the results is presented. At 608, the portion of the program code that corresponds to the portion of the tree can also be presented. The user can then toggle between the views in which the tree portion and the code portion are presented. Additionally, if the user navigates to a different results portion in the tree, the corresponding portion in the code will be presented in the code view (or window). Conversely, if the user navigates to a different code portion in the code view, the corresponding results portion in the tree will be presented in the tree view.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
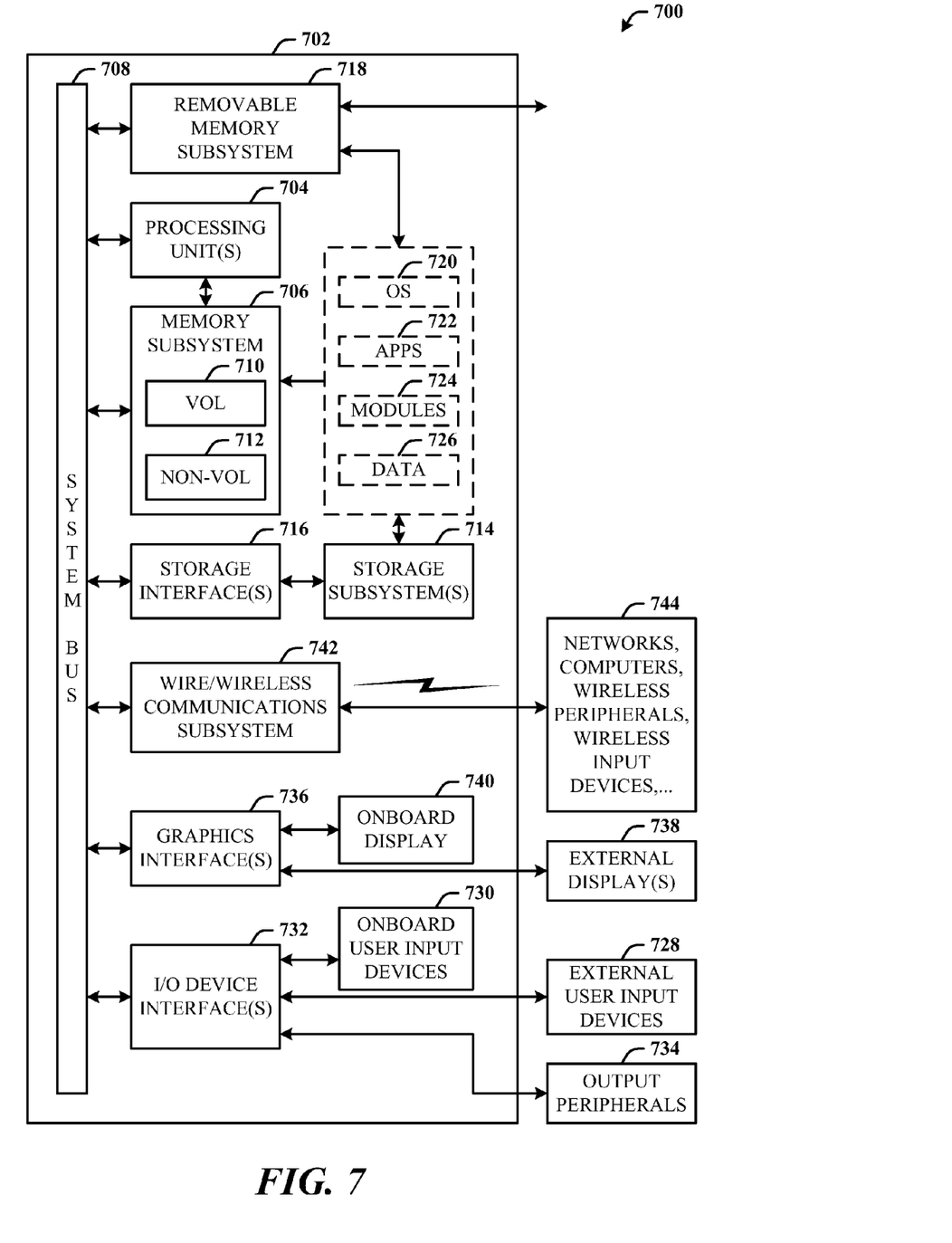
FIG. 7 illustrates a block diagram of a computing system operable to execute structured code searching in accordance with the disclosed architecture.

Referring now to FIG. 7, there is illustrated a block diagram of a computing system 700 operable to execute structured code searching in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714, including an operating system 720, one or more application programs 722, other program modules 724, and program data 726. The one or more application programs 722, other program modules 724, and program data 726 can include the entities of the system 100 of FIG. 1, the entities of the system 200 of FIG. 2, the user interface 300 of FIG. 3, the user interfaces 300 and 400 of FIG. 4, and the methods shown in FIGS. 5-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wire/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wire/wireless communication subsystem 742 (e.g., a network interface adapter, onboard transceiver subsystem, etc.) to communicate with wire/wireless networks, wire/wireless printers, wire/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
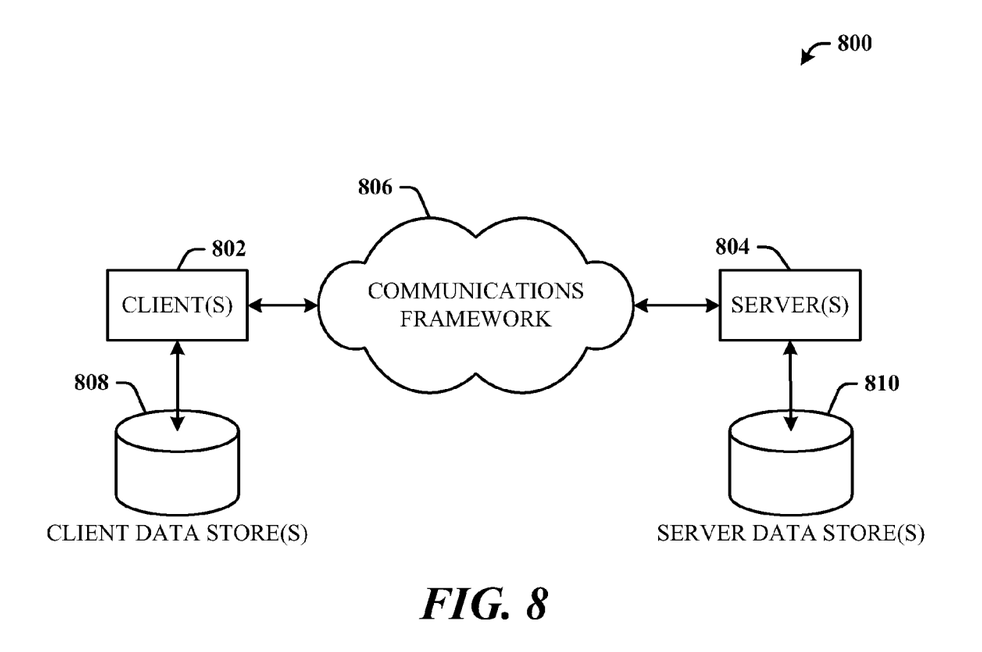
FIG. 8 illustrates a schematic block diagram of a computing environment for structured code searching.

Referring now to FIG. 8, there is illustrated a schematic block diagram of a computing environment 800 for structured code searching. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

The systems 100 and 200 shown herein can be employed solely on one of the client(s) 802 for code searching, solely on one of the server(s) 804 for searching, on one of the client(s) that is searching code on one of the server(s) 804, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented search system, the search system comprising:
    a processor; and
    a memory in communication with the processor, the memory comprising computer-executable instructions that, when executed by the processor, cause the processor to
        represent, utilizing a conversion component, a grammar of a program code as an abstract syntax tree; and
        search, utilizing a search component, the abstract syntax tree based on a code-related query to obtain code results, the code-related query comprising an expression in a form of a grammatical unit, the processing of which by the search component initiates the search of the abstract syntax tree for program code statements contained within the program code.

2. The system of claim 1, wherein the abstract syntax tree is represented in extensible markup language (XML).

3. The system of claim 1, wherein the search component processes the query over the abstract syntax tree according to an extensible markup language (XML) query language.

4. The system of claim 1, wherein the abstract syntax tree is stored in a cache and the search component performs the search on the abstract syntax tree in the cache.

5. The system of claim 1, wherein the expression is a natural language expression.

6. A computer-implemented search system, the search system comprising:
    a processor; and
    a memory in communication with the processor, the memory comprising computer-executable instructions that, when executed by the processor, cause the processor to
        represent, utilizing a conversion component, a syntax of a program code as an abstract syntax tree; and
        search, utilizing a search component, the abstract syntax tree based on a code-based query to obtain code results, the code-based query comprising a natural language expression in a form of a grammatical unit, the processing of which by the search component initiates the search of the abstract syntax tree for program code statements contained within the program code as represented.

7. The system of claim 6, wherein the abstract syntax tree is represented in extensible markup language (XML), and the search component processes the query over the abstract syntax tree according to an XML query language.

8. The system of claim 6, wherein the abstract syntax tree is stored in a cache and the search component performs the search on the abstract syntax tree in the cache.

9. A computer-implemented method of searching code, the method comprising:
    representing, utilizing a computer, a grammar of a program code as an abstract syntax tree;
    searching, utilizing the computer, the abstract syntax tree based on a code-related query to obtain code results;
    returning, utilizing the computer, the code results, the code results being associated with a portion of the abstract syntax tree;

mapping, utilizing the computer, the portion of the abstract syntax tree to a corresponding portion of the program code;

presenting, on a display in communication with the computer, a first view comprising the portion of the abstract syntax tree that includes the portion of the program code in which the code results are found;

presenting, on the display, a second view comprising the portion of the program code; and facilitating toggle between the first view and the second view.

10. The method of claim 9, further comprising representing the abstract syntax tree in extensible markup language (XML).

11. The method of claim 10, further comprising searching the extensible markup language (XML) abstract syntax tree using an Xpath language.

12. The method of claim 9, further comprising composing the query as an expression structured as a grammatical unit.

13. The method of claim 9, wherein the query is a natural language expression.

14. The method of claim 9, further comprising:

receiving, at the computer, input that navigates to a different portion of the abstract syntax tree; and in response to receiving the input, presenting, on the display, a corresponding different portion of the program code in the second view.

15. The method claim 9, further comprising:

receiving, at the computer, input that navigates to a different portion of the program code; and in response to receiving the input, presenting, on the display, a corresponding different portion of the abstract syntax tree in the first view.

* * * * *